United States Patent [19]

Townsend

[11] 4,196,320
[45] Apr. 1, 1980

[54] METHOD AND MEANS FOR POWERING TELEPHONE SPAN LINES

[75] Inventor: Todd V. Townsend, Reno, Nev.

[73] Assignee: Lynch Communication Systems, Inc., Reno, Nev.

[21] Appl. No.: 866,696

[22] Filed: Jan. 3, 1978

[51] Int. Cl.² ............................................ H04B 3/44
[52] U.S. Cl. .................... 179/170 J; 323/21; 363/26; 363/56
[58] Field of Search ............ 179/170 R, 170 J; 323/20, 21, 9, DIG. 1; 363/16, 23, 25, 26, 56

[56] References Cited

U.S. PATENT DOCUMENTS

| | | | |
|---|---|---|---|
| 3,701,937 | 10/1972 | Combs | 363/25 |
| 3,818,307 | 6/1974 | Hamilton et al. | 179/170 J |
| 3,839,668 | 10/1974 | Black | 363/23 |
| 3,859,586 | 1/1975 | Wadlington | 363/25 |
| 3,916,282 | 10/1975 | Rothermel | 363/25 |
| 4,032,830 | 6/1977 | Buonavita | 363/25 |
| 4,058,758 | 11/1977 | Peterson | 363/25 |

OTHER PUBLICATIONS

B. Hamilton and S. Mottel; "L5 System: Line-Power Feed;" Bell System Technical Journal; vol. 53, No. 10; Dec. 1974; pp. 1987-2009.

N. Suzuki, H. Tanaka, T. Sugiura; "PCM-400 M Power-Feed Equipment;" Review of the Electrical Communication Laboratories; vol. 24, No. 9-10; Sep.-Oct. 1976; pp. 737-745.

W. Sahm; "General Electric Optoelectronics Manual;" 1976; pp. 70-72.

*Primary Examiner*—Bernard Konick
*Assistant Examiner*—Randall P. Myers
*Attorney, Agent, or Firm*—Phillips, Moore, Weissenberger, Lempio & Majestic

[57] ABSTRACT

An essentially non-dissipative, strap-free, continuously adjustable power unit inherently impervious to shorts and open circuits for powering repeaters in a T1 or similar telephone span line is disclosed. The unit uses a pulse-width modulated inverter in the converter input circuit to produce a variable-voltage D.C. output to the span line. The pulse width or duty cycle of the inverter is controlled by a control logic which senses the span line current and maintains it at a selectable predetermined level without any apreciable power dissipation.

5 Claims, 3 Drawing Figures

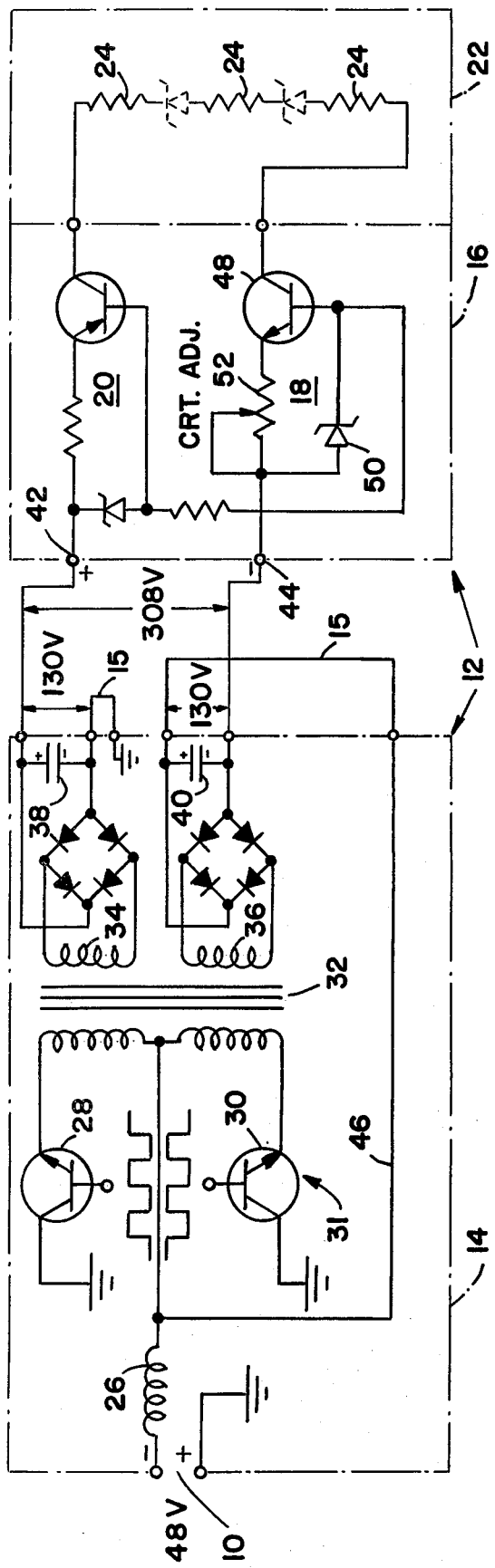
FIG_1 (PRIOR ART)
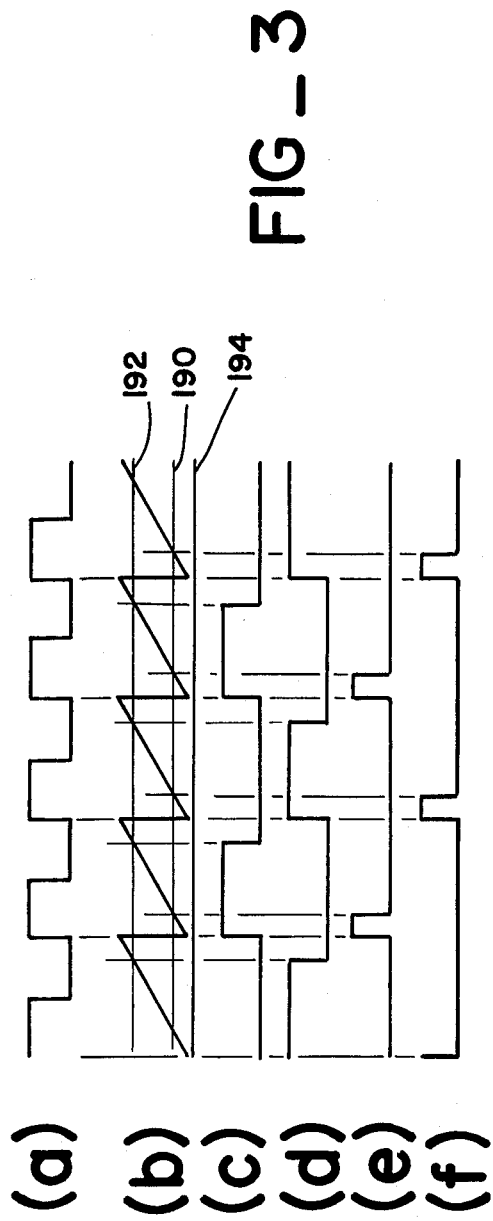
FIG_3

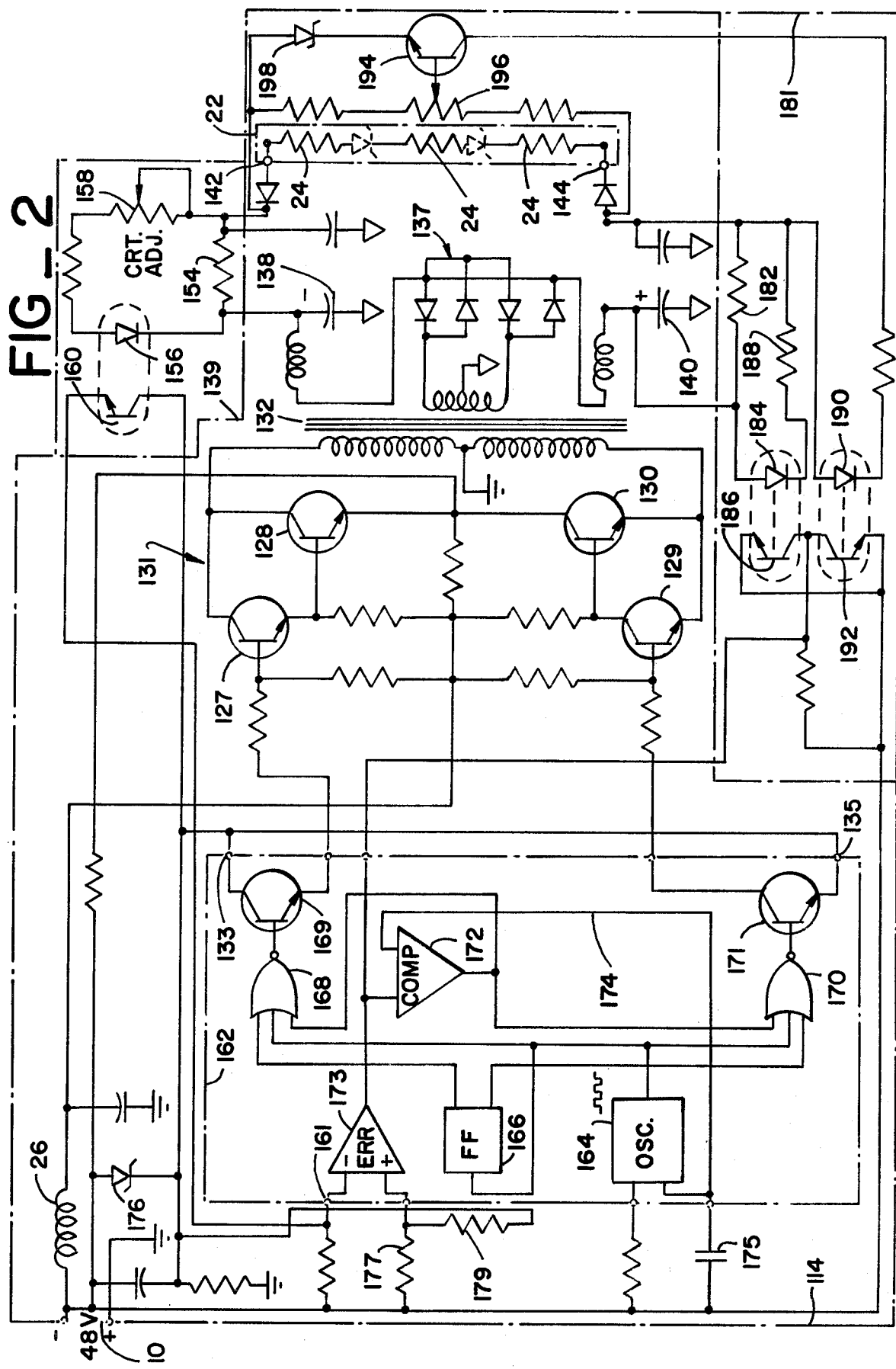

METHOD AND MEANS FOR POWERING TELEPHONE SPAN LINES

BACKGROUND OF THE INVENTION

Telephone span lines of the T1 or similar type contain a series of repeaters spaced at intervals along the line to regenerate the 1.544 MHz PCM signals carried by this type of line. These repeaters are powered by a D.C. loop formed by two of the cable pairs of the span. A number of repeaters are connected in series in this loop. The cable acts as a fixed load resistance determined essentially by its gauge and length, and each repeater acts essentially like a zener diode, regardless of span traffic, so that a constant voltage applied to the central office end of the loop will produce a constant and identical power current through each of the repeaters in the loop.

It has been standard telephone industry practice in the past to use a span power unit which contains a converter strappable to provide various discrete D.C. voltage outputs representing various combinations of −48 volts and ±130 volts (the most common voltages used in the telephone network). The selected voltage was then supplied to the span through a regulator which produced a constant current (determined by the parameters of a zener diode and resistor in the regulator circuit) in the D.C. loop.

This standard arrangement has several disadvantages. To begin with, it wastes an often substantial amount of power because any voltage drop not used by the repeaters in the constant-current D.C. loop (there will normally be some because of the limited number of D.C. loop supply voltages available) must be absorbed by the regulator transistor and uselessly dissipated as heat. Secondly, the regulator requires some kind of cooling scheme, such as a heat sink, which is bulky and restricts the placement of the power unit to adequately ventilated locations. Thirdly, the prior art unit requires careful strapping for the proper voltage, which can be a problem when design errors occur in the field or inexperienced installation personnel is involved. Fourthly, a separate heat-dissipative overload cut-off transistor is needed to protect the circuit from burning out if a short circuit occurs very close to the unregulated end of the loop. Finally, some of the available loop supply voltage levels require a direct interconnection between the primary D.C. power source and the span's D.C. loop, which can be undesirable under certain circumstances.

SUMMARY OF THE INVENTION

The present invention overcomes the disadvantages of the prior art by using a variable-duty-cycle inverter controlled by a control logic responsive to deviations of the D.C. loop current from a predetermined norm.

The circuit of the invention not only provides essentially non-dissipative current regulation, but also keeps the span line loop isolated at all times from the primary power supply, and maintains the selected loop current without any in-the-field voltage selection or strapping, regardless of the span line load parameters. In addition, it does so with much smaller and more universally locatable power units at an initial cost generally comparable to that of corresponding prior art units.

It is therefore the object of the invention to provide an essentially non-dissipative constant-current power supply for telephone span lines.

It is a further object of the invention to provide a constant-current power supply for telephone span lines which is independent of the load resistance of the span and requires no preselection of the loop supply voltage.

It is another object of the invention to vary the inverter duty cycle of a span line power supply driven by a fixed-potential D.C. primary voltage in response to the D.C. loop current of the span to provide a constant loop current.

It is a still further object of the invention to provide a variable D.C. supply voltage for the span line loop from a single primary D.C. power supply without any direct connection between the span line loop and the primary D.C. power supply.

BRIEF DESCRIPTION OF THE DRAWINGS

FIG. 1 is a circuit diagram illustrating the operation of a typical prior art device which the inventive device is intended to replace;

FIG. 2 is a circuit diagram, partly in block form, of a preferred embodiment of the invention; and FIG. 3 is a time-amplitude diagram illustrating the waveforms and relationships of various signals in the circuit of FIG. 2.

DESCRIPTION OF THE PREFERRED EMBODIMENT

FIG. 1 illustrates the conventional way of powering a span line of the T1 or similar type. The −48 V central office battery 10 is the primary power supply for the power unit 12 which, in the prior art, consists of a fixed-voltage-ratio converter 14 whose various terminals can be strapped (as, for example, at 15) to produce a variety of fixed D.C. voltage levels to accommodate various span line lengths (FIG. 1 shows the strapping connections for producing a 308 V output), and a dissipative regulator 16 equipped with a regulator network 18 and an overload cut-off network 20. The output of the power unit 12 is a typically 60 mA constant-current D.C. supply to the span line 22 represented schematically by the load resistance 24.

Typically, the prior-art converter 14 consists, besides an A.C. isolation choke 26, of a pair of transistors 28,30 connected to form an inverter 31. Complementary square-wave enabling signals, whose "0" and "1" periods are of equal duration, are applied to inverter transistors 28,30. Transformer 32 translates the actions of the inverter transistors 28,30 into equal A.C. voltages in the secondary windings 34,36. After rectification and filtering in the conventional manner, separate 130 V D.C. outputs are produced across each of filter capacitors 38,40. By strapping the negative end of capacitor 38 to ground and the positive end of capacitor 40 to the −48 V primary D.C. supply, a total potential difference of 130+48+130=308 V D.C. is developed between terminals 42 and 44. It will be noted that this prior art scheme requires a direct connection, under some conditions, via lead 46, between the output side of converter 14 and the primary power supply 10.

The output of converter 14 is applied to the input of regulator 16. In the regulator 16, the regulator network 18 produces a selectable constant current $I=(V_z-V_{BE})/R$, where $V_z$ is the constant voltage drop across zener diode 50, $V_{BE}$ is the constant base-emitter voltage of regulator transistor 48, and R is the preselected resistance of current-adjusting resistor 52. The regulator transistor 48 thus has to provide a sufficient effective resistance to maintain the current I for any given value of span line load resistance 24. It is this effective resistance of regulator transistor 48 which dissipates as heat any power not used by the span line 22. In a typical installation, dissipations of 15 watts or more are not uncommon, and bulky heat sinks and good ventilation are needed. This is particularly true inasmuch as field installation personnel cannot always be relied upon to strap the converter for the most efficient output voltage level.

In a similar manner, the overload protection network 20 operates to limit the span line current to a predetermined maximum in the event of, e.g., a short to ground at the positive end of the span line 22. The transistor of this overload protection network is normally saturated so as to be essentially non-dissipative except in the event of an overload. The heat dissipation, which occurs on an overload, may be used to trip a thermal circuit breaker (not shown) to shut off the power unit 12.

FIG. 2 shows, by contrast, the inventive method of controlling the span line loop current in a substantially non-dissipative manner by automatically varying the input/output voltage ratio of the converter to maintain a constant converter output current regardless of the parameters of the span line, rather than by dissipating the excess power delivered by the prior-art fixed-voltage-ratio converter. This automatic voltage ratio variation is achieved, in accordance with the invention, by varying the duty cycle of the inverter transistors through an adjustable servo loop so that the converter output voltage will be maintained at precisely the level necessary to produce a preselected span line loop current.

In FIG. 2, 10 again denotes the primary −48 V D.C. power supply or central office battery, and 22 again denotes the span line with its effective load resistance 24. The non-dissipative span line power unit of this invention consists simply of a servoed variable-voltage-ratio converter 114 which dispenses with the need for a separate regulator. In the converter 114, the primary power is applied to the power transistors 128,130 of inverter 131, which are connected in series with the two halves of the primary winding of transformer 132 generally as in the prior art device of FIG. 1. In the converter 114, however, the bases of inverter power transistors 128,130 are operatively connected (through driver transistors 127,129) to the control outputs 133,135 of the servo loop formed by inverter 131, transformer 132, rectifier 137, current sensor 139, and control logic 162, rather than to complementary squarewave sources as in FIG. 1.

The D.C. output of the converter 114 appears between the output terminals 142 and 144. In the span line power unit of FIG. 2, the span line 22 is connected directly to the terminals 142 and 144.

For any given turns ratio of transformer 132 at a given primary supply voltage, the voltage induced in the secondary winding(s) of transformer 132 is proportional to the duty cycle of inverter transistors 128,130, i.e., to the ratio of their actual "on" time to their maximum possible "on" time. The actual "on" time of inverter transistors 128,130 is controlled as a function of the D.C. loop current of span line 22 by the control logic 162 in the manner now to be described.

A voltage proportional to the span line loop current is developed across the sensing resistor 154 connected in series with the span line 22. The resistor 154 is preferably quite small; in the preferred embodiment, its resistance may be about 22 ohms, which results in a dissipation of about 0.14 W at the maximum operational span line loop current of 80 mA or less than 0.1 W at the minimum operational span line loop current of 60 mA.

The voltage drop developed across resistor 154 constitutes the control input of the servo loop. Although this voltage could be amplified and used directly (through appropriate buffers) for the purposes of the servo loop, better and more simple isolation of the span line 22 from the primary power source 10 can be achieved by optical coupling between the current sensor 139 and the control logic 162. This is accomplished in a conventional manner by using a light-emitting diode 156 in series with a current selection potentiometer 158 to induce in photodiode 160 a current representative of a selected portion of the voltage drop across resistor 154.

The output of photodiode 160 is applied to the input 161 of control logic 162, which may take the form of a commercially available integrated circuit chip such as the SG 3524 regulating pulse width modulator manufactured by Silicon General Corporation. Basically, this circuit consists of a square wave oscillator 164 which puts out a clock signal connected to trigger a frequency divider flip-flop 166. The outputs of the flip-flop 166 provide one input to each of a pair of NOR gates 168,170 whose other input comes from the output of a comparator 172. The comparator 172 is designed to allow NOR gates 168,170 to enable control transistors 169,171 only when the output of error amplifier 173 is lower than the instantaneous amplitude of the sawtooth wave on line 174 produced by capacitor 175 in conjunction with the output of square wave generator 164. The output of error amplifier 173 in turn is representative of the difference between the voltage produced at input 161 by photodiode 160 and a fixed reference voltage established by zener diode 176 and voltage divider 177,179.

The output of control logic 162 (depicted in curves c through f of FIG. 3) switches the driver transistors 127,129. These in turn switch the power transistors 128,130 on and off in a duty cycle automatically tailored to provide whatever span line loop voltage is necessary to maintain the span line loop current at the level selected by potentiometer 158.

The control logic 162, as described below, may also be used to provide non-dissipative overcurrent protection. Although overcurrent protection is not required for the basic functioning of the invention (inasmuch as the span line loop current is limited to a safe value by the operation of the inventive circuit itself), it is desirable as a practical matter to provide it to take care of possible control failures and of accidental shorts to ground in the lower half (in FIG. 2) of the span line 22.

Overcurrent and overvoltage protection is achieved in the preferred embodiment of FIG. 2 by the over-limit protection circuit 181. The voltage drop developed by the span line current across a small resistor 182 connected in series with the span line D.C. loop is applied to a light-emitting diode 184. A corresponding photodiode 186 is connected to the error input of comparator 172 so as to reduce the duty cycle of transistors 128, 130, as described below, when an overcurrent condition occurs. The magnitude of the span line current which is necessary to constitute an overcurrent condition is determined by the value of resistor 188.

Overvoltage protection is achieved in a similar manner by light-emitting diode 190 in conjunction with photodiode 192. The light-emitting diode 190 is actuated by an excessive base voltage on transistor 194 resulting from an excessive supply voltage to the span line 22. The magnitude of the supply voltage which will cause the overvoltage protection circuit to operate is determined by the setting of potentiometer 196 and by the value of zener diode 198.

The optical coupling provided by light-emitting diodes 156,184,190 and photodiodes 160,186,192, respectively, in conjunction with transformer 132, provides total D.C. isolation between the power circuitry of span line 22 and the central office circuitry including the control logic 162.

It will be noted that the circuit of this invention, rather than cutting the span line power supply off in case of an overcurrent or overvoltage condition, merely maintains the current and voltage within preset limits, so that the span line instantly returns to normal operation when the cause of the overvoltage or overcurrent condition is removed.

FIG. 3 illustrates the waveforms at various points in the circuit of FIG. 2. FIG. 3(a) shows the trigger output of oscillator 164. FIG. 3(b) illustrates the sawtooth wave produced on line 174 by ramp capacitor 175 and oscillator 164. If the span line 22 is short, it will require a relatively low converter output voltage to deliver the requisite current to line 22, and the output of error amplifier 173 maintains itself at level 190. If the span line 22 is long, it will require a higher converter output voltage to produce the same span line current, and the output of error amplifier 173 maintains itself at level 192.

With the error amplifier output level at 192, transistor 169 is enabled in accordance with FIG. 3(c), and transistor 171 is enabled in accordance with FIG. 3(d). When the error amplifier output level is at 190, transistors 169 and 171 are enabled in accordance with FIG. 3(e) and 3(f), respectively, for a shorter duty cycle and hence a lower converter output voltage.

What is claimed is:

1. A non-dissipative power supply for supplying a constant current to the D.C. loop of a communication line regardless of the resistance characteristics of said loop, comprising:
   (a) inverter means including a pair of switching means alternatively energized for variable periods of time, of variable length and transformer means for producing an output voltage generally proportional to the length of said variable periods of time;
   (b) means arranged to apply to said D.C. loop of said communication line a D.C. voltage generally proportional to said output voltage;
   (c) duty-cycle control means arranged to vary the length of said periods of time in accordance with a control signal representative of the current in said D.C. loop;
   (d) means for generating said control signal, said means including resistive means connected in series with said D.C. loop, and means connected in parallel with said resistive means for outputting said control signal as a function of the current flowing through said resistive means, said means for outputting said control signal comprising second resistive means and a light emitting diode connected in series with said second resistive means, the resistance of said second resistive means controlling the amount of current flowing through said diode; and
   (e) means applying said control signal to said duty-cycle control means so as to maintain said D.C. loop current substantially constant.

2. The power supply of claim 1, in which said last-named means incude light responsive means arranged to transfer said control signal to said duty-cycle control means.

3. The power supply of claim 1, further comprising protective means operatively connected to said duty-cycle control means, said protective means being responsive to abnormal current conditions in said D.C. loop and arranged to reduce said time period length sufficiently to maintain said D.C. loop current within a preset limit during the occurrence of said abnormal conditions.

4. The power supply of claim 1, further comprising protective means operatively connected to said duty-cycle control means, said protective means being responsive to abnormal voltage conditions in said D.C. loop and arranged to reduce said time period length sufficiently to maintain said D.C. voltage within a preset limit during the occurrence of said abnormal conditions.

5. The power supply of claim 1, wherein said second resistive means comprises a manually variable resistor, for enabling the selective variation of the amplitude of said current flowing through said diode, thereby enabling the selective control of the absolute value of said D.C. loop current.

* * * * *